United States Patent
Balasubramanian

(10) Patent No.: US 9,083,722 B2
(45) Date of Patent: Jul. 14, 2015

(54) SESSION INITIATION PROTOCOL REGISTRATION WITH PING

(75) Inventor: Srinivasan Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 651 days.

(21) Appl. No.: 12/238,867

(22) Filed: Sep. 26, 2008

(65) Prior Publication Data

US 2009/0094361 A1    Apr. 9, 2009

Related U.S. Application Data

(60) Provisional application No. 60/978,072, filed on Oct. 5, 2007.

(51) Int. Cl.
 *G06F 15/16* (2006.01)
 *H04L 29/06* (2006.01)

(52) U.S. Cl.
 CPC ........ *H04L 65/1073* (2013.01); *H04L 65/1006* (2013.01); *H04L 65/80* (2013.01)

(58) Field of Classification Search
 CPC ............ H04L 65/1006; H04L 65/1073; H04L 29/06333; H04L 43/08; H04L 65/80
 USPC ................. 709/240, 213, 239, 224, 223, 227; 370/352, 395.2, 231, 221, 216
 See application file for complete search history.

(56) References Cited

U.S. PATENT DOCUMENTS

| | | | |
|---|---|---|---|
| 7,145,898 B1 | 12/2006 | Elliott | |
| 2002/0165928 A1* | 11/2002 | Landfeldt et al. | 709/213 |
| 2003/0147350 A1* | 8/2003 | Wookey et al. | 370/231 |
| 2004/0006615 A1* | 1/2004 | Jackson | 709/223 |
| 2004/0032862 A1* | 2/2004 | Schoeneberger et al. | 370/352 |
| 2004/0054805 A1* | 3/2004 | Sen et al. | 709/240 |
| 2005/0097221 A1* | 5/2005 | James | 709/239 |
| 2006/0230134 A1* | 10/2006 | Qian et al. | 709/224 |
| 2006/0291400 A1 | 12/2006 | Balasaygun et al. | |
| 2007/0237155 A1* | 10/2007 | Hardie et al. | 370/395.2 |
| 2008/0062863 A1* | 3/2008 | Ginde | 370/221 |
| 2008/0062997 A1* | 3/2008 | Nix | 370/395.2 |

FOREIGN PATENT DOCUMENTS

| | | |
|---|---|---|
| JP | 2001086167 A | 3/2001 |
| JP | 2002374290 A | 12/2002 |

(Continued)

OTHER PUBLICATIONS

International Search Reprot—PCT/US08/078997, International Search Authority—European Patent Office—Jan. 8, 2009.

(Continued)

*Primary Examiner* — Jungwon Chang
(74) *Attorney, Agent, or Firm* — Ashish L. Patel

(57) ABSTRACT

Systems and methodologies are described that facilitate improving session initiation protocol based registration of a mobile device and an IP multimedia subsystem in wireless communications. The mobile device discovers one or more SIP servers (e.g., proxy call session control functions) that are available. The mobile device issues a ping message to each discovered server in parallel to determine reachability. Based at least in part on measured round trip times associated with the ping messages, the mobile device initiates registration procedures with at least one server.

38 Claims, 11 Drawing Sheets

(56) References Cited

FOREIGN PATENT DOCUMENTS

| | | |
|---|---|---|
| JP | 2003198603 A | 7/2003 |
| JP | 2004260244 A | 9/2004 |
| JP | 2005086397 A | 3/2005 |
| JP | 2007013970 A | 1/2007 |
| JP | 2007082196 A | 3/2007 |
| JP | 2007508766 A | 4/2007 |
| JP | 2007124113 A | 5/2007 |
| JP | 2008032302 A | 2/2008 |
| JP | 2008541550 A | 11/2008 |
| JP | 2009526425 A | 7/2009 |
| WO | WO2005039132 A1 | 4/2005 |
| WO | WO2006118495 A1 | 11/2006 |
| WO | WO2007090463 A1 | 8/2007 |

OTHER PUBLICATIONS

Written Opinion—PCT/US08/078997, International Search Authority—European Patent Office—Jan. 8, 2009.
Taiwan Search Report—TW097140284—TIPO—Dec. 5, 2012.

* cited by examiner

SESSION INITIATION PROTOCOL REGISTRATION WITH PING

CROSS-REFERENCE TO RELATED APPLICATIONS

This application claims the benefit of U.S. Provisional Patent application Ser. No. 60/978,072 entitled "METHOD AND APPARATUS FOR OPTIMIZING A REGISTRATION PROCEDURE" which was filed Oct. 5, 2007. The entirety of the aforementioned application is herein incorporated by reference.

BACKGROUND

I. Field

The following description relates generally to wireless communications, and more particularly to improving session initiation protocol registration by utilizing ping messages to determine reachability.

II. Background

Wireless communication systems are widely deployed to provide various types of communication content such as, for example, voice, data, and so on. Typical wireless communication systems may be multiple-access systems capable of supporting communication with multiple users by sharing available system resources (e.g. bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

MIMO systems commonly employ multiple ($N_T$) transmit antennas and multiple ($N_R$) receive antennas for data transmission. A MIMO channel formed by the $N_T$ transmit and $N_R$ receive antennas may be decomposed into $N_S$ independent channels, which may be referred to as spatial channels, where $N_S \leq \{N_T, N_R\}$. Each of the $N_S$ independent channels corresponds to a dimension. Moreover, MIMO systems may provide improved performance (e.g., increased spectral efficiency, higher throughput and/or greater reliability) if the additional dimensionalities created by the multiple transmit and received antennas are utilized.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with improving session initiation protocol based registration of a mobile device and an IP multimedia subsystem in wireless communications. The mobile device discovers one or more SIP servers (e.g., proxy call session control functions) that are available. The mobile device issues a ping message to each discovered server in parallel to determine reachability. Based at least in part on measured round trip times associated with the ping messages, the mobile device initiates registration procedures with at least one server.

According to related aspects, a method that facilitates improving session initiation protocol registration is provided. The method can comprise discovering a plurality of proxy servers. The method can also include transmitting a ping message to each discovered proxy server, wherein the ping message solicits a return response. Further, the method can include measuring a round trip time associated with each ping message. In addition, the method can also include initiating a registration procedure with at least one of the discovered proxy servers based upon measured round trip times.

Another aspect relates to a communications apparatus that facilitates session initiation protocol registration. The communications apparatus can include means for discovering a plurality of proxy servers. The communications apparatus can also comprise means for transmitting a ping message to each discovered proxy server, wherein the ping message solicits a return response. Further, the communications apparatus can include means for measuring a round trip time associated with each ping message. In addition, the communications apparatus can also comprise means for initiating a registration procedure with at least one of the discovered proxy servers based upon measured round trip times.

Yet another aspect relates to a wireless communications apparatus. The wireless communications apparatus can include a memory that retains instructions related to discovering a plurality of proxy servers, transmitting a ping message to each discovered proxy server, wherein the ping message solicits a return response, measuring a round trip time associated with each ping message and initiating a registration procedure with at least one of the discovered proxy servers based upon measured round trip times. In addition, the wireless communications apparatus can further comprise a processor, coupled to the memory, configured to execute the instructions retained in the memory.

Still another aspect relates to a computer program product, which can have a computer-readable medium. The computer-readable medium can include code for causing a computer to discover a plurality of proxy servers. The computer-readable medium can also comprise code for causing the computer to transmit a ping message to each discovered proxy server, wherein the ping message solicits a return response. Further, the computer-readable medium can also include code for causing the computer to measure a round trip time associated with each ping message. In addition, the computer-readable medium can comprise code for causing the computer to initiate a registration procedure with at least one of the discovered proxy servers based upon measured round trip times.

Another aspect relates to an apparatus in a wireless communications system. The apparatus can comprise a processor configured to discover a plurality of proxy servers. The processor can also be configured to transmit a ping message to each discovered proxy server, wherein the ping message solicits a return response. The processor can further be configured to measure a round trip time associated with each ping message. In addition, the processor can be configured to initiate a registration procedure with at least one of the discovered proxy servers based upon measured round trip times.

Another aspect described herein relates to a method that facilitates session initiation protocol registration of a mobile device. The method can include receiving at least one ping message from a mobile device. The method can also comprise sending a return message to the mobile device in response to the at least one ping message. In addition, the method can also include initiating registration with the mobile device based at least in part on a round trip time required to transmit and receive the at least one ping message and the return message.

Still yet another aspect relates to a communications apparatus that facilitates session initiation protocol registration. The communications apparatus can comprise means for receiving at least one ping message from a mobile device. The communications apparatus can also include means for sending a return message to the mobile device in response to the at least one ping message. In addition, the communications apparatus can comprise means for initiating registration with the mobile device based at least in part on a round trip time required to transmit and receive the at least one ping message and the return message.

A further aspect described herein relates to a wireless communications apparatus that can comprise a memory. The memory can retain instructions related to receiving at least one ping message from a mobile device, sending a return message to the mobile device in response to the at least one ping message and initiating registration with the mobile device based at least in part on a round trip time required to transmit and receive the at least one ping message and the return message. In addition, the wireless communications apparatus can also include a processor, coupled to the memory, configured to execute the instructions retained in the memory.

Still another aspect relates to a computer program product, which can have a computer-readable medium that includes code for causing a computer to receive at least one ping message from a mobile device. The computer-readable medium can also comprise code for causing the computer to send a return message to the mobile device in response to the at least one ping message. In addition, the computer-readable medium can include code for causing the computer to initiate registration with the mobile device based at least in part on a round trip time required to transmit and receive the at least one ping message and the return message.

Yet another aspect relates to an apparatus in a wireless communications system. The apparatus can comprise a processor configured to receive at least one ping message from a mobile device. The processor can also be configured to send a return message to the mobile device in response to the at least one ping message. In addition, the processor can be configured to initiate registration with the mobile device based at least in part on a round trip time required to transmit and receive the at least one ping message and the return message.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
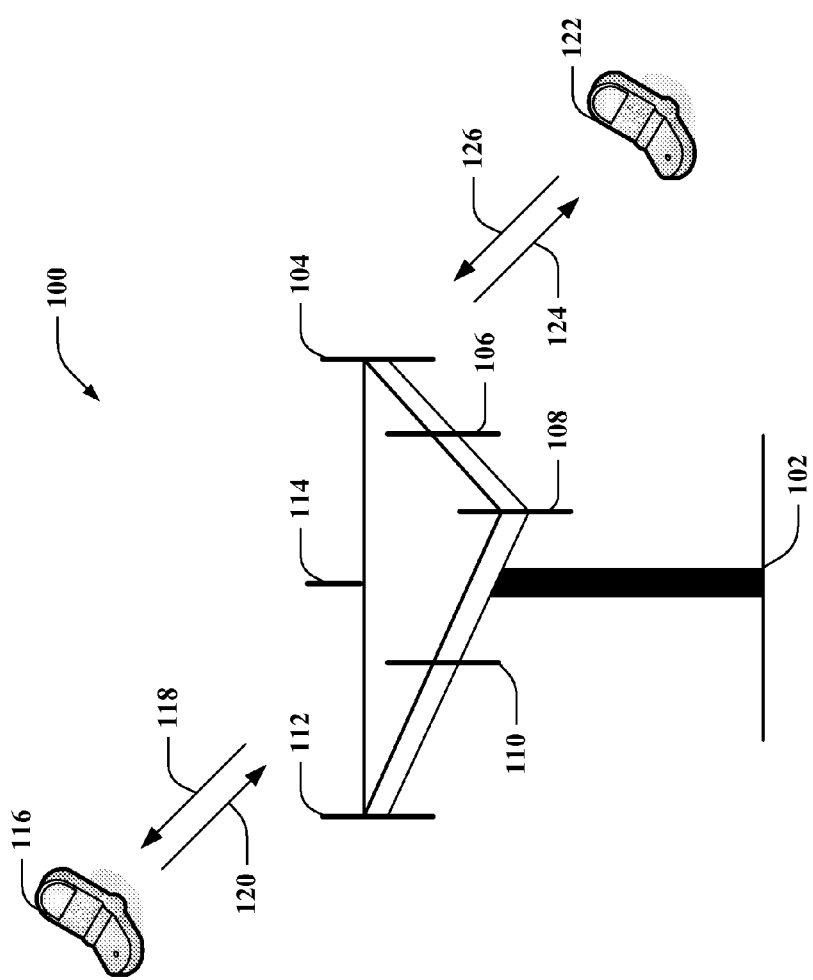
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. This can be provided by using a precoder to steer signals in desired directions, for example. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology in one example. According to an example, system 100 can be a multiple-input multiple-output (MIMO) communication system. Further, system 100 can utilize substantially any type of duplexing technique to divide communication channels (e.g., forward link, reverse link, . . . ) such as FDD, TDD, and the like.

Figure 2:
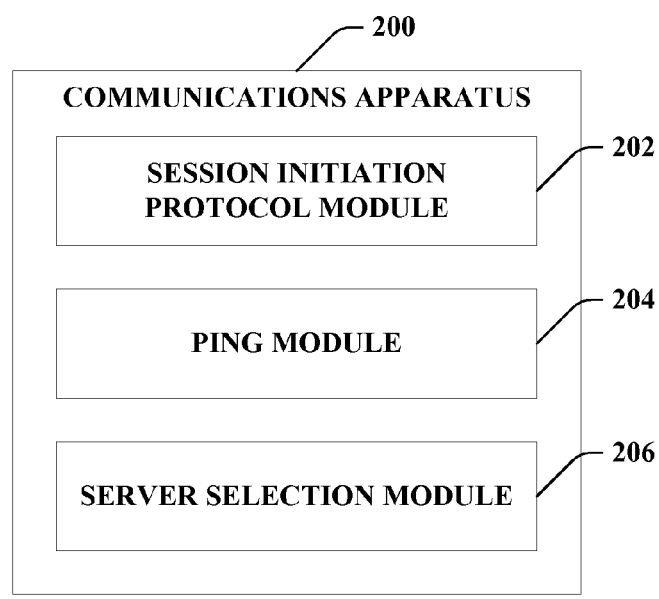
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. In communications systems, the communications apparatus 200 can employ components described below to enable selecting a reachable session initiation protocol (SIP) server prior to commencement of registration procedures.

The communications apparatus 200 can include a session initiation protocol (SIP) module 202 that utilizes SIP (e.g., a signaling protocol) to set up and/or destroy multimedia communication sessions. For example, SIP can be employed to establish sessions associated with applications such as, but not limited to, video conferencing, instant messaging, online games, streaming multimedia and the like. In addition, SIP can be utilized to establish communication sessions within an IP multimedia subsystem (IMS) to enable IP-based multimedia services in wireless communications systems.

Pursuant to an example, the SIP module 202 can discover SIP servers, such as proxy call session control functions (P-CSCF), that provide an interface between the communications apparatus 200 and the IMS (not shown). The SIP module 202 can discover SIP servers by obtaining a list of P-CSCFs entries from a dynamic host configuration protocol (DHCP) server, for instance. The SIP module 202 is not guaranteed that a discovered SIP server is reachable. A P-CSCF entry on the obtained list can be temporarily out of contact with the communications apparatus 200 or no longer active (e.g., an old entry that has yet to be purged). In one aspect, the SIP module 202 initiates registration procedures with a P-CSCF entry to determine reachability. The registration procedure can requires multiple attempts such that approximately thirty seconds are needed for each entry in the list to determine reachability.

According to another aspect, the communications apparatus 200 can further include a ping module 204 that can facilitate ascertaining reachability of SIP servers (e.g., P-CSCFs). The ping module 204 can transmit ping messages to each SIP server. In one aspect, the ping module 204 transmits ping messages to all proxy servers in parallel. A ping message is a mechanism by which availability of a particular server/entity in the network can be tested. The ping message solicits a response from a target (e.g., a proxy server or P-CSCF) such that the target returns a response upon receipt of the ping message. A target that is reachable or available returns a response while unreachable targets do not. The ping module 204 can measure round trip time that corresponds to time required for a particular ping message to be sent and received added to time needed for a response to be sent and received. In another example, the ping module 204 can send multiple ping messages to improve reliability of round trip time measurements. The ping module 204 can aggregate all round trip time measurements and evaluate at least one of an average time, a minimum time, a maximum time, a median time, and//or any other statistical metric applicable to a collection of measurements.

The communications apparatus 200 can also include a server selection module 206 that chooses a server (e.g., a proxy server or P-CSCF) from reachable servers. The reachable servers include discovered servers that sent response to ping messages transmitted by the ping module 204. The server selection module 206 can select the server with the lowest measured round trip time. Moreover, the server selection module 206 can select the server with the lowest average, minimum, maximum or median round trip time based upon a plurality of measurement. In addition, it is to be appreciated that the server selection module 206 can select a server based upon a combination of statistical metrics. For instance, the server selection module 206 can choose a server with an average trip time that is the lowest but also ties a second server and the server has a lower median time than the second server. After selection, the SIP module 202 can initiate registration procedures with the selected server.

In accordance with another aspect, the communications apparatus 200 can process with SIP registration with a first responder (e.g., the first server, proxy server or P-CSCF that responds to the ping messages). During this initial registration with the first responder, the communications apparatus 200 can ignore other servers that respond later. The communications apparatus 200 can maintain responses received from other servers. Thus, if the initial registration fails, the communications 200 can attempt registration with other servers for which responses received. For instance, the communications apparatus 200 can employ a selection technique such as those described above. In addition, the communications apparatus 200 can attempt registration with a second server to respond in time. The communications apparatus 200 can repeat this process as many times as necessary until a successful registration occurs.

Moreover, although not shown, it is to be appreciated that communications apparatus 200 can include memory that retains instructions discovering servers, proxy servers and/or P-CSCFs, transmitting ping messages, receiving ping message response, measuring round trip times, selecting servers based upon round trip time measurements and the like. In addition, the memory can retain instructions for aggregating and statistically analyzing measurements from multiple ping messages to improve reliability. Further, communications apparatus 200 may include a processor that may be utilized in connection with executing instructions (e.g., instructions retained within memory, instructions obtained from a disparate source, . . . ).

Figure 3:
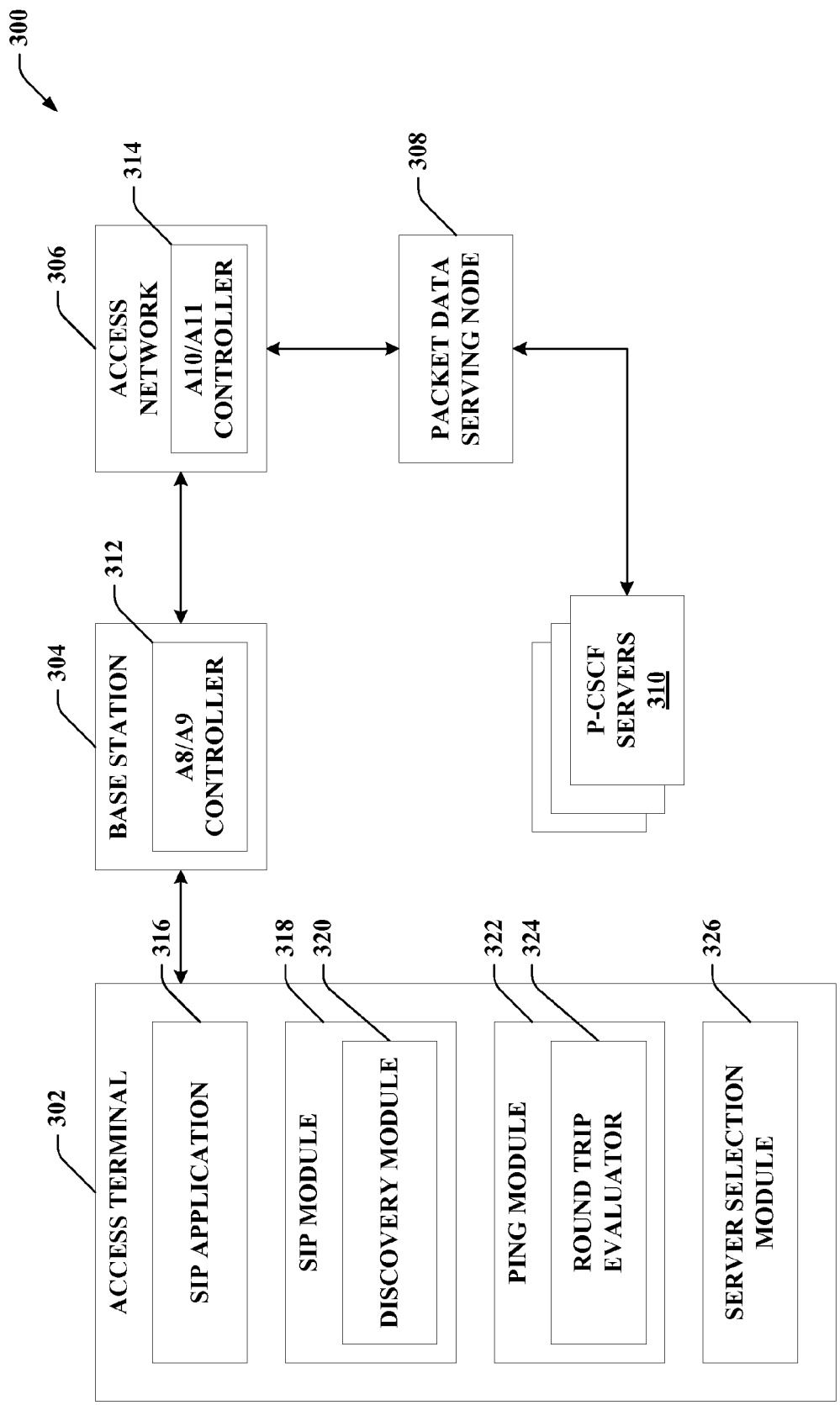
FIG. 3 is an illustration of an example wireless communications system that facilitates determining reachability of proxy SIP servers prior to initiation of registration procedures.

Now referring to FIG. 3, illustrated is a wireless communications system 300 that facilitates determining reachability of proxy SIP servers prior to initiation of registration procedures. The system 300 includes an access terminal 302 (e.g., mobile device, user equipment, mobile terminal . . . ) that can communicate with a base station 304 (and/or any number of disparate devices (not shown)). The base station 304 can transmit information to the access terminal 302 over a forward link channel or downlink channel; further base station 304 can receive information from the access terminal 302 over a reverse link channel or uplink channel. Moreover, system 300 can be a MIMO system. Additionally, the system 300 can operate in an OFDMA wireless network (such as 3GPP, 3GPP2, 3GPP LTE, etc., for example). Also, the components and functionalities shown and described below in the base station 304 can be present in the access terminal 302 and vice versa, in one example.

The system 300 can further include an access network 306 that can perform radio functionality of a wireless network and provide a connection or interface to a core network (not shown) that can interface with a public switched network. The access network 306 can be a radio access network, a UMTS terrestrial radio access network, an LTE network, an evolution-data optimized (EV-DO) network and the like. In addition, the access network 306 can include one or more radio network controllers (not shown) that control utilization and reliability of radio resources. The system 300 can also include a packet data serving node (PDSN) 308 that can establish, maintain and terminate point-to-point (PPP) sessions associated with a mobile device such as access terminal 302. It is to be appreciated that PDSN 308 can be a GPRS support node in a GSM or UMTS network or any other support node that manages PPP connections for a particular network. In addition, the system 300 can include one or more P-CSCF servers 310 that enable SIP registration of access terminal 302 and facilitate connections between the access terminal 302 and the IMS (not shown).

Pursuant to an illustration, the access terminal 302 can communicate with the base station 304 via an over the air or radio connection. The base station 304 includes an A8/A9 controller 312 that can establish A8 and/or A9 interfaces between the base station 304 and the access network 306. In particular, the A8 interface carries user data between the base station 304 and a packet control function (not shown) of the access network 306. The A9 interface carries control or signaling information between the base station 304 and the access network 306. The access network 306, in turn, can include a A10/A11 controller 314 that facilitates establishing and utilizing A10 and/or A11 interfaces between the access network 306 and the PDSN 308. Similar to the A8 and A9 interfaces, the A10 and A11 interfaces carry user data and signaling information, respectively between the access network 306 and the PDSN 308.

In accordance with an example, the access terminal 302 can include a SIP application 316 that requires an IP connection (e.g., a multimedia communication session) to multimedia services provided by the IMS. For instance, the SIP application 316 can be a voice over IP application, a multimedia streaming application or any other multimedia-based application that requires the IMS. The access terminal 302 includes a SIP module 318 that facilitates establishment of a multimedia communication session that can be employed by the SIP application 316. The SIP module 318 can include a discovery module 320 that obtains a listing of proxy servers (e.g., P-CSCF servers 310) that provide an interface between the access terminal 302 and the IP multimedia subsystem. The discovery module 320 can obtain the list from a DHCP server that has entries for each P-CSCF 310. In accordance with an aspect, the P-CSCFs 310 can register with the DHCP server upon activation to enable the DHCP server to create an entry for the P-CSCF 310 on a list of available servers. To acquire the listing, the access terminal 302 can signal the base station 304 over the air. The base station 304 can forward requests to the access network 306 via an A8 or A9 interface. The access network 306, via an A10 or A11 interface, can request the PDSN 308 to establish a PPP connection for the access terminal 302. Afterwards, the access terminal 302 can utilize IP based protocols to access servers or other components.

A ping module 322 is provided that transmits a ping message to each proxy server in the listing obtained by the discovery module 320 to determine which servers in the listing are reachable. According to an aspect, the ping module 322 can send the ping messages to all servers in parallel. The ping module 322 can include a round trip evaluator 324 that measures round trip times based upon a time stamp of the transmission of a ping message and a time stamp associated with a return response. A server selection module 326 can select a proxy server from a set of reachable servers. A reachable server is one that returns a response to a ping message. According to an aspect, the server selection module 326 can choose a proxy server with a lowest round trip time as determined by the round trip evaluator 324. After selection, the SIP module 318 can initiate SIP registration with the selected proxy server to enable establishment of a multimedia communication session for the SIP application 316. In addition, the server selection module 326 can rank all reachable servers in accordance with measure round trip times and initiate registration with each ranked server, in turn, until a multimedia session is established.

Figure 4:
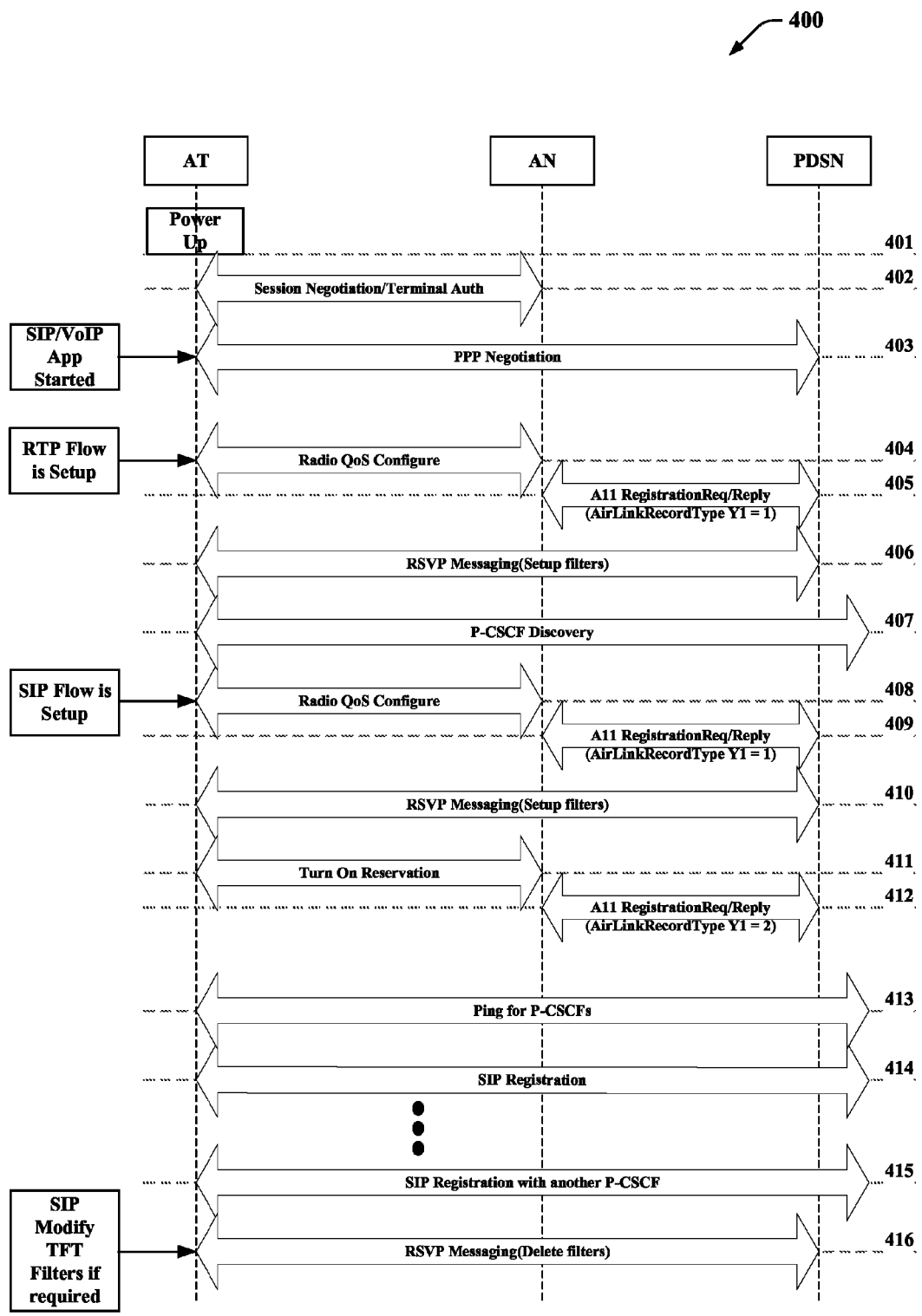
FIG. 4 is an illustration call flow that depicts selecting and registering with a proxy server according to an aspect of the subject disclosure.

FIG. 4 illustrates an example call flow 400 that depicts selecting and registering with a proxy server (e.g., a P-CSCF) according to an aspect of the subject disclosure. The call flow 400 includes an access terminal (AT), an access network (AN) and a packet data serving node (PDSN). The call flow 400 is described within context of a Voice-over-IP (VoIP) feature in a 1xEV-DO Revision A system. However, it is to be appreciated that the procedure depicted in the call flow 400 can be adapted to other features and/or other systems.

Pursuant to an example, a SIP reservation can be made according to the following. SIP and VoIP QoS applications are started. Based upon interactions with lower layers of the AT, the SIP/VoIP applications know if the currently associated AN supports VoIP. In addition, a given AN is considered QoS aware if the AN configures the AT with MPA and/or EMPA. If the AN does not support VoIP, the AT bypasses the remainder of call flow 400 and registers with a circuit switched network. The VoIP application configures a real-time protocol (RTP) QoS. Once RTP configuration is complete, the VoIP application triggers the SIP application to perform an IMS registration. The SIP application acquires an address of a P-CSCF (e.g., SIP server) and configures and/or activates a QoS for a SIP flow. On the SIP QoS is configured and activated, the AT proceeds with IMS registration. If the SIP application times out and does not receive a response, the SIP application attempts to reach an alternative P-CSCF. Once IMS is successful, an address of the P-CSCF can be changed in the SIP QoS configuration, if necessary. The SIP reservation remains in an open state.

Turning back to the call flow 400, an alternative approach is described. Initially, at 401, the AT powers up for the first time. At 402, the AT performs session negotiation. The AN provides a list of quality of service (QoS) profiles that the AN can handle as part of a parameter negotiation for multi-flow packet application (MPA)/enhanced multi-flow packet application (EMPA). In addition, 402 can include access authentication (e.g., authentication of the access terminal).

At 403, a SIP application triggers activation of a PPP session, if one is not already established. At 404, a VoIP application requests to configure an RTP flow for a first call. The AN configures radio protocols with appropriate parameters requires to carry the RTP flow. At 405, the AN performs A11 signaling to establish A10 interface connections. At 406, traffic flow template (TFT) filters and channel treatment information are configured at the PDSN via RSVP messaging. After 406, the RTP flow is successfully configured and a reservation remains in an off state. The VoIP application is notified of the successful RTP QoS flow configuration.

At 407, a SIP application determines a list of P-CSCF (e.g., SIP server) addresses. At 408, the SIP application requests to configure the SIP QoS flow. The AT negotiates with the AN to configure the radio protocols required to carry the SIP flow. In addition, the PDSN is also configured with necessary TFT filters. At 409, an A10 connection is established between the AN and PDSN. At 410, the AT performs RSVP messaging to setup filters at the PDSN. The TFT filters and channel treatment information are configured at the PDSN. The filter utilized for the SIP flow is a source address of a P-CSCF and destination address of the AT. The P-CSCF address utilized is an address from the list of P-CSCF addresses.

At 411, the AT requests the AN to turn the reservation to an on state after successful configuration of the radio QoS flow and the PDSN filters. At 412, the AN notifies the PDSN that the SIP QoS flow is activated. Pursuant to an example, the QoS for the RTP flow can be CONFIGURED/READY and the QoS for the SIP flow is CONFIGURED/READY/GRANTED. Pursuant to an illustration, CONFIGURED implies that the QoS has been requested with the appropriate network that is providing the QoS metrics required. READY indicates that the network has responded and is providing the QoS configuration to the AT. The QoS configuration can include provisioning parameters for different protocol layers (e.g., RLP, MAC, etc.). GRANTED implies the QoS flow ahs been turned on with resources required for the QoS flow operation allocated to the AT.

At 413, the application requests to execute ping messages to the nods (e.g., SIP servers) identified in the P-CSCF list. During P-CSCF discovery, the AT can obtain multiple addresses without knowledge of which amongst the list are reachable. Moreover, the AT can have access to only a subset of P-CSCF entries in the list. The ping messages enable avoidance of unnecessary delays incurred by the application due to directly attempts to discover reachability through IMS registration process as described above. The ping messages improve performance of the AT in associating with a right P-CSCF quickly (e.g., application registration attempts can required approximately thirty seconds before reachability is determined) to enable quick utilization of services. In accordance with an aspect, the ping messages can be executed in parallel to all P-CSCF entries. Additionally, the AT can discover a nearest P-CSCF based on a measured round trip time. The ping messages can also be issued multiple times to increase reliability of measurements and the application can be provided with an minimum, an average, and/or a maximum round trip time. The round trip time measurement procedures can aid in optimizing delay encountered with SIP signaling and can provide a real-time impact in establishing a SIP session. The application can be informed of P-CSCF entries in the list that are reachable and associated round trip times. The application can execute a registration process with P-CSCF entries that are reachable, starting with the entry having the minimum round trip time. If, during this process, a user initiates a call, the AT can switch to a 1x system and the AT can execute this process again when the call ends. The ping messages enable services can move back to data optimized quickly.

At 414, IMS registration commences if QoS configuration for the SIP flow is successful. It is to be appreciated that IMS registration can occur over a default flow if SMS over 1xEV-DO is supported. The AT selects an address from the list of P-CSCF determined during the discovery procedure. If IMS registration times out, the IMS registration is tried with other P-CSCF entries from the list. The AT starts a timer waiting for a response from the P-CSCF. The AT can encounter issues with IMS registration. For example, the AT can be only allowed to register with a specific P-CSCF entry. The AT can still retry registration amongst other reachable P-CSCFs, if registration with the initially selected server fails.

Steps 415 and 416 occur if IMS registration fails for the selected P-CSCF at 414. At 415, the AT selects another entry from the P-CSCF list and repeats steps 413 and 414. At 416, the TFT filter needs to be changed to support the new P-CSCF address (e.g., the address of the P-CSCF ultimately connected to). The AT QoS modify procedures executes a change in the filter settings while retaining the original QoS configuration for radio parts.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Figure 5:
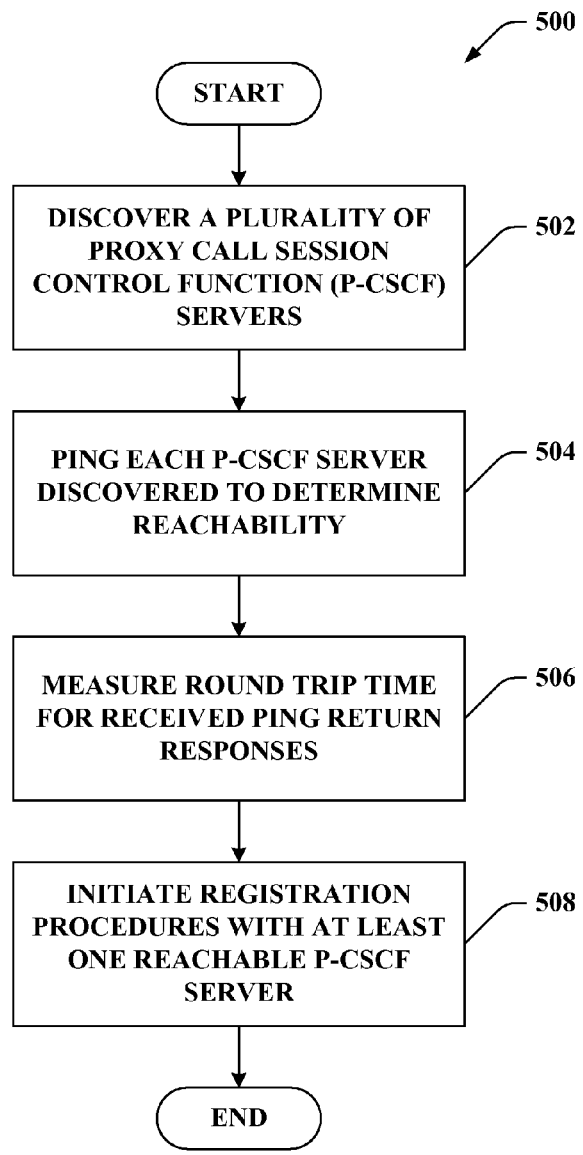
FIG. 5 is an illustration of an example methodology that facilitates selecting a reachable server prior to initiation of IMS registration procedures utilizing a session initiation protocol.
Figure 6:
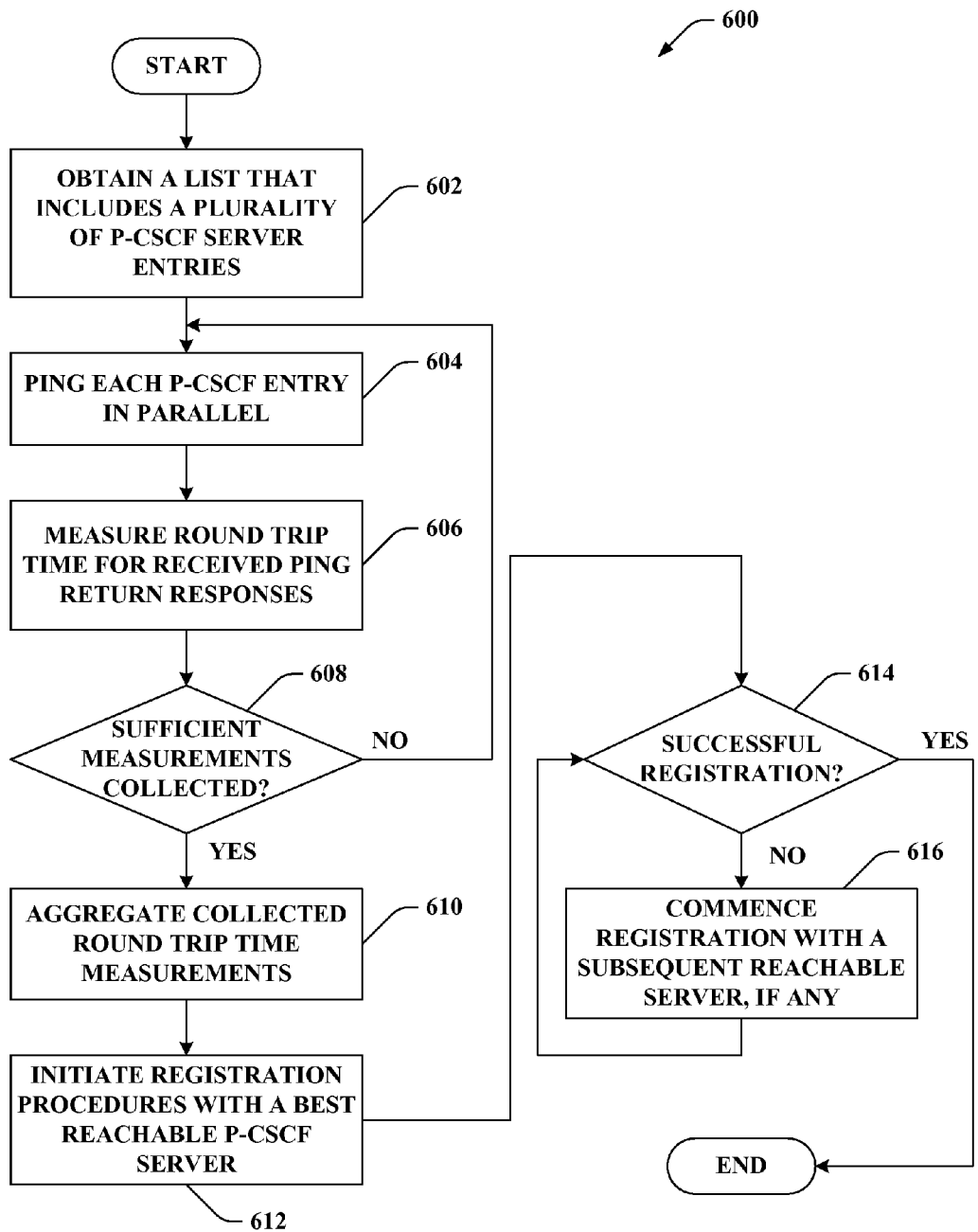
FIG. 6 is an illustration of an example methodology that facilitates selecting a reachable server prior to initiation of IMS registration procedures utilizing a session initiation protocol.

Referring to FIGS. 5-6, methodologies relating to employing ping messages to determining reachability of P-CSCFs prior to commencement of registration procedures. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, illustrated is a methodology 500 that facilitates selecting a reachable server prior to initiation of IMS registration procedures utilizing a session initiation protocol. In one example, the method 500 can be employed by mobile device to establish a multimedia communication session with the IMS to enable multimedia services. At reference numeral 502, a plurality of proxy call session control functions (P-CSCF) are discovered. The P-CSCFs can be SIP servers. At reference numeral 504, each P-CSCF server is pinged (e.g., a ping message is transmitted to the server) to determine reachability. A ping message solicits a return response such that a server that is reachable sends a response to the ping message. At reference numeral 506, round trip times associated with ping messages for which return responses are received are measured. At reference numeral 508, registration procedures are initiation with at least one reachable P-CSCF. Pursuant to an illustration, the registration procedures can be initiated with the reachable P-CSCF associated with fastest measured round trip time.

Referring now to FIG. 6, illustrated is a methodology 500 that facilitates selecting a reachable server prior to initiation of IMS registration procedures utilizing a session initiation protocol. In one example, the method 500 can be employed by mobile device to establish a multimedia communication session with the IMS to enable multimedia services. At reference numeral 602, a list that includes of plurality of P-CSCF entries is obtained. At reference numeral 604, each P-CSCF is transmitted a ping messages in parallel. At reference numeral 606, round trip times associated with received ping message responses are measured. At reference numeral 608, a determination is made as to whether sufficient measurements have been collected. For example, a setting can indicate that N measurements are to be made, where N is an integer greater than or equal to one. If additional measurements are required, the method 600 returns to reference numeral 604 to issue another round of ping messages and acquire additional time measurements. If sufficient measurements have been collected, the method 600 proceeds to reference numeral 610, where collected round trip time are aggregated. For instance, the collected measurements can be averaged. In addition, a minimum, a maximum, a median, or any other statistical metric can be evaluated based upon the collected measurements.

At reference numeral 612, registration procedures are initiated with a best reachable P-CSCF. A reachable P-CSCF is one that returned a response to a ping message. The best P-CSCF can be one with the lowest aggregated round trip time, for example. At reference numeral 614, a determination is made as to whether registration is successful. If yes, the method 600 ends. If No, the method 600 proceeds to reference numeral 616 where registration is commenced with a subsequent reachable server, if any. If no reachable servers are available, session establishment fails. The method 600 can iterated through reference numerals 614 and 616 until registration is successful.

It will be appreciated that, in accordance with one or more aspects described herein, inferences can be made regarding selecting measuring round trip times associated with ping messages, selecting SIP servers with which to initiated registration, determining reachability, and the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 7:
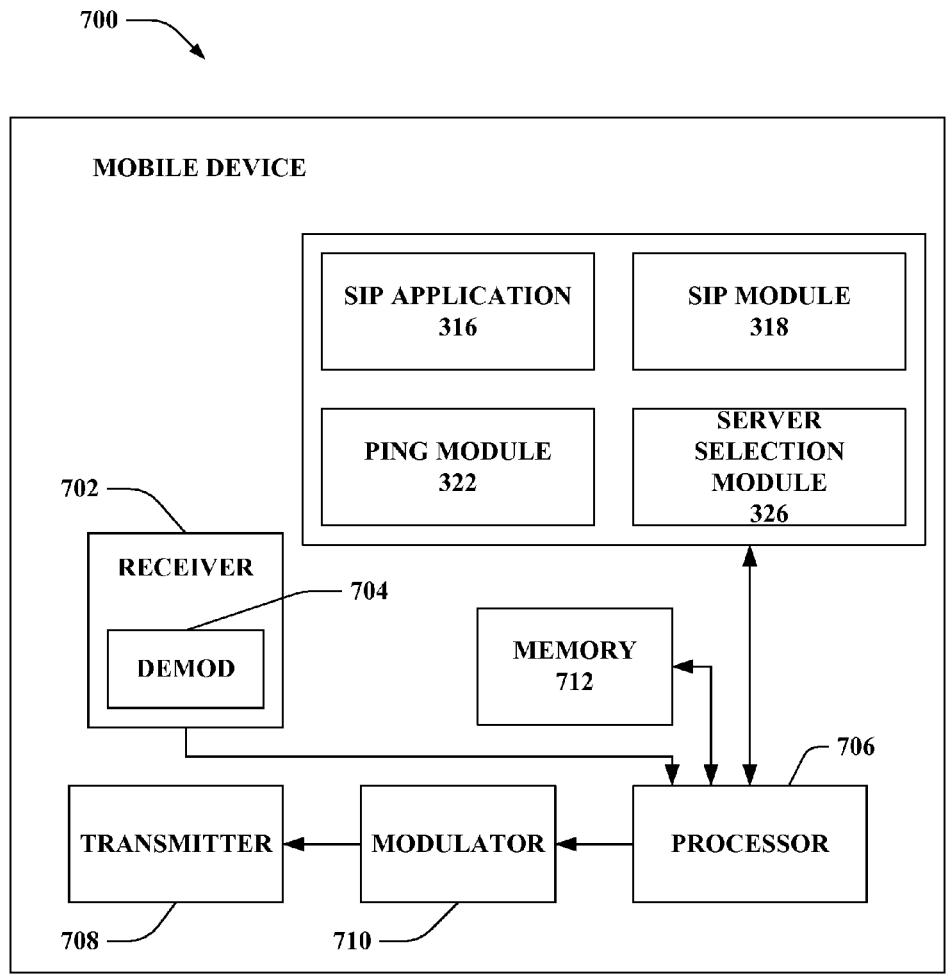
FIG. 7 is an illustration of an example system that facilitates communications associated with a mobile device in a wireless communication system in accordance with an aspect of the disclosed subject matter.

FIG. 7 is an illustration of a mobile device 700 that can facilitate communications associated with a mobile device in a wireless communication system in accordance with an aspect of the disclosed subject matter. It is to be appreciated that the mobile device 700 can be the same or similar as, and/or can comprise the same or similar functionality as mobile device 116, 200, or 302, such as more described herein, for example, with regard to system 100, system 200, system 300, methodology 500, and methodology 600.

Mobile device 700 can comprise a receiver 702 that receives a signal from, for instance, a receive antenna (not shown), and performs typical actions thereon (e.g., filters, amplifies, downconverts, etc.) the received signal and digitizes the conditioned signal to obtain samples. Receiver 702 can be, for example, an MMSE receiver, and can comprise a demodulator 704 that can demodulate received symbols and provide them to a processor 706 for channel estimation. Processor 706 can be a processor dedicated to analyzing information received by receiver 702 and/or generating information for transmission by a transmitter 708, a processor that controls one or more components of mobile device 700, and/or a processor that both analyzes information received by receiver 702, generates information for transmission by transmitter 708, and controls one or more components of mobile device 700. Mobile device 700 can also comprise a modulator 710 that can work in conjunction with the transmitter 708 to facilitate transmitting signals (e.g., data) to, for instance, a base station (e.g., 102), another mobile device (e.g., 122), etc.

In one aspect, the processor 706 can be connected to a SIP application 316 that requires an IP connection (e.g., a multimedia communication session) to multimedia services provided by the IMS. In another aspect, the processor 706 can be coupled to a SIP module 318 that facilitates establishment of a multimedia communication session that can be employed by the SIP application 316. The SIP module 318 can obtain a listing of proxy servers (e.g., P-CSCF servers) that provide an interface between the mobile device 700 and the IP multimedia subsystem. The processor 706 also can be coupled to aping module 322 that transmits a ping message to each proxy server in the listing obtained by the SIP module 318 to determine which servers in the listing are reachable. The ping module 322 can measure round trip times based upon a time stamp of the transmission of a ping message and a time stamp associated with a return response. In another aspect, the processor 706 can be further coupled to a server selection module 326 that can select a proxy server from a set of reachable servers. After selection, the SIP module 318 can initiate SIP registration with the selected proxy server to enable establishment of a multimedia communication session for the SIP application 316.

Mobile device 700 can additionally comprise memory 712 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 712 can additionally store protocols and/or algorithms associated with estimating and/or utilizing a channel (e.g., performance based, capacity based, etc.).

It will be appreciated that the data store (e.g., memory 712) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 712 of the subject systems and methods is intended to comprise, without being limited to, these and any other suitable types of memory.

It is to be appreciated and understood that the SIP application 316, SIP module 318, ping module 322 and/or the server selection module 326 each can be the same or similar as, and/or can comprise the same or similar functionality as, respective components, such as more fully described herein, for example, with regard to system 300. It is to be further appreciated and understood that the SIP application 316, SIP module 318, ping module 322, the server selection module 326, and memory 712, each can be a stand-alone unit (as depicted), can be included within the processor 706, can be incorporated within another component, and/or virtually any suitable combination thereof, as desired.

Figure 8:
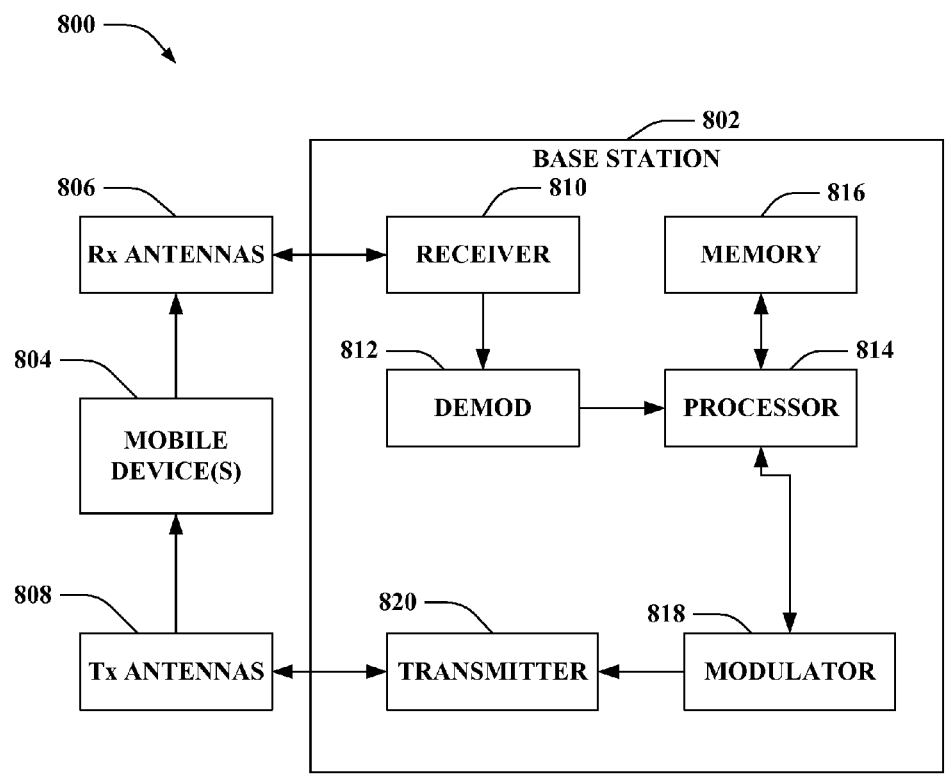
FIG. 8 is an illustration of an example system that facilitates communications associated with a mobile device in a wireless communication system in accordance with an aspect of the disclosed subject matter

FIG. 8 is an illustration of a system 800 that can facilitate communications associated with a mobile device in a wireless communication system in accordance with an aspect of the disclosed subject matter. The system 800 comprises a base station 802 (e.g., access point, . . . ) with a receiver 810 that receives signal(s) from one or more mobile devices 804 through a plurality of receive antennas 806, and a transmitter 824 that transmits to the one or more mobile devices 804 through a transmit antenna 808. Receiver 810 can receive information from receive antennas 806 and is operatively associated with a demodulator 812 that demodulates received information. Demodulated symbols are analyzed by a processor 814 that can that can be a processor dedicated to analyzing information received by receiver 810, generating information for transmission by a transmitter 820, a processor that controls one or more components of base station 802, and/or a processor that concurrently analyzes information received by receiver 810, generates information for transmission by transmitter 820, and controls one or more components of base station 802. In addition, the processor 814 can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein.

In addition, the memory 816 can store data to be transmitted, received data, information related to available channels, data associated with analyzed signal and/or interference strength, information related to an assigned channel, power, rate, or the like, and any other suitable information for estimating a channel and communicating via the channel. Memory 816 can additionally store protocols and/or algorithms associated with estimating and/or utilizing a channel (e.g., performance based, capacity based, etc.). The base station 802 can also comprise a modulator 818 that can work in conjunction with the transmitter 820 to facilitate transmitting signals (e.g., data) to, for instance, mobile devices 804, another device, etc. Furthermore, although depicted as being separate from the processor 814, it is to be appreciated demodulator 812, and/or modulator 818 can be part of the processor 814 or multiple processors (not shown).

It will be appreciated that the memory 816 described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory.

Figure 9:
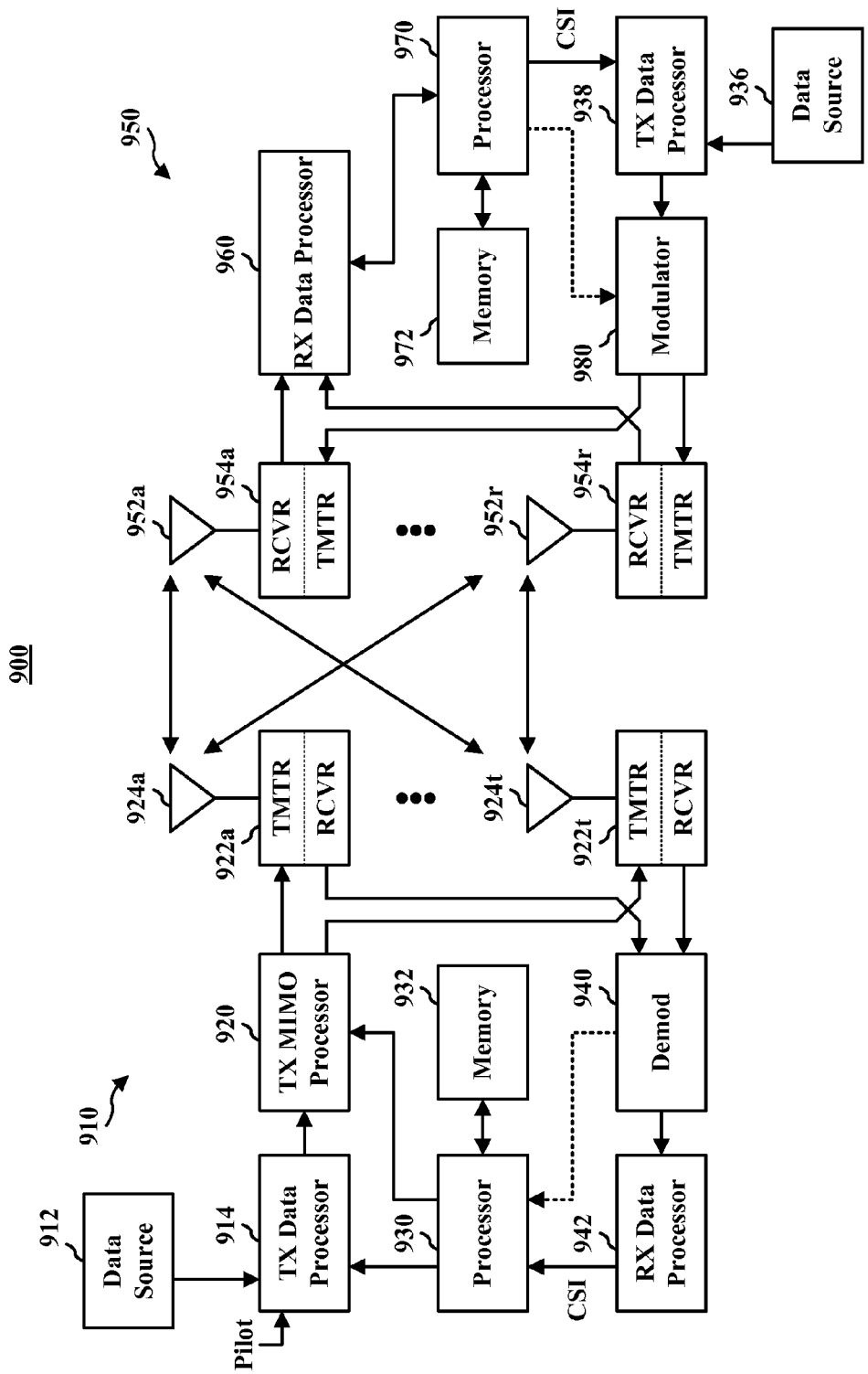
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-3 and 7-8), call flow (FIG. 4) and/or methods (FIGS. 5-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g. symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides NT modulation symbol streams to NT transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g. amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 1720 and TX data processor 914 at base station 910.

A processor 970 can periodically determine which preceding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
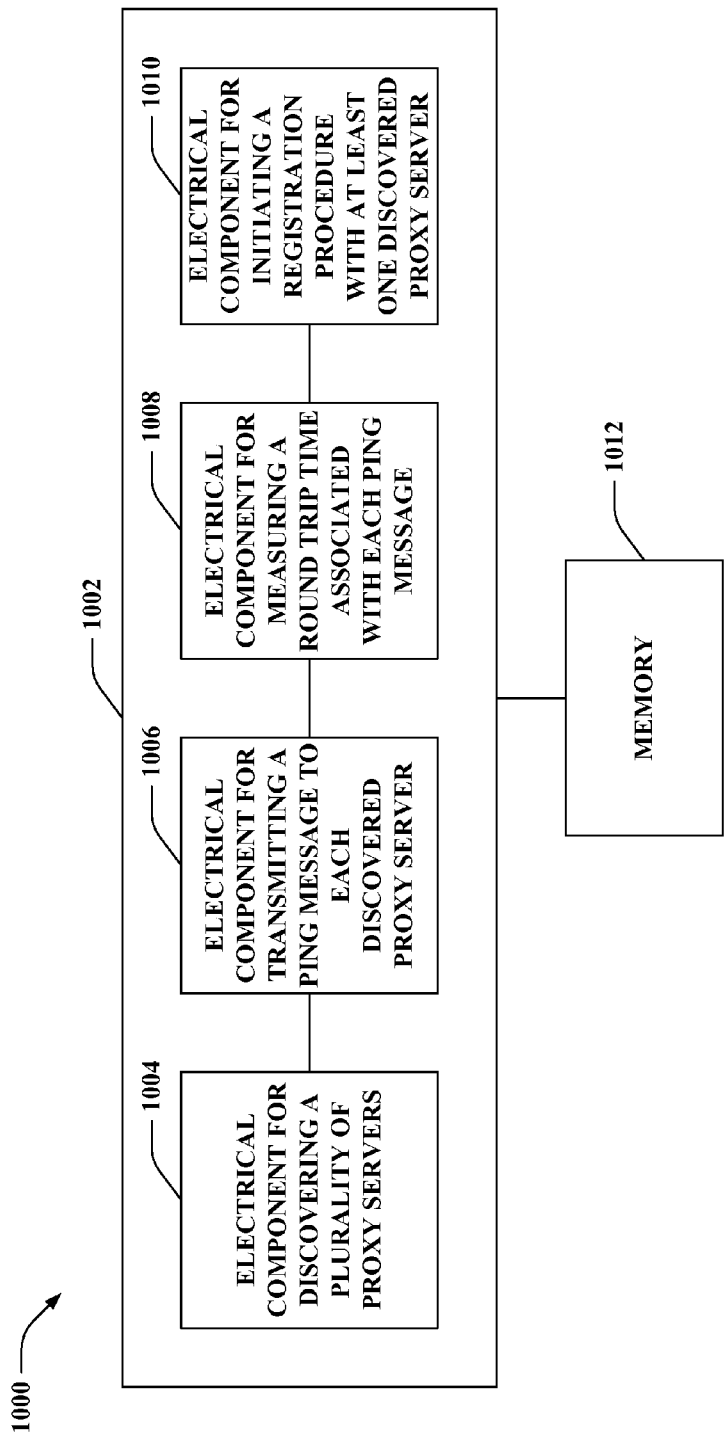
FIG. 10 is an illustration of an example system that determines reachability of P-CSCFs during SIP registration via ping messages.

With reference to FIG. 10, illustrated is a system 1000 that determines reachability of P-CSCFs during SIP registration via ping messages. For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for discovering a plurality of proxy servers 1004. Further, logical grouping 1002 can comprise an electrical component for transmitting a ping message to each discovered proxy server 1006. Moreover, logical grouping 1002 can comprise an electrical component for measuring a round trip time associated with each ping message 1008. Further, logical grouping 1002 can comprise an electrical component for initiating a registration procedure with at least one discovered proxy server 1010. Additionally, system 1000 can include a memory 1012 that retains instructions for executing functions associated with electrical components 1004, 1006, 1008 and 1010. While shown as being external to memory 1012, it is to be understood that one or more of electrical components 1004, 1006, 1008 and 1010 can exist within memory 1012.

Figure 11:
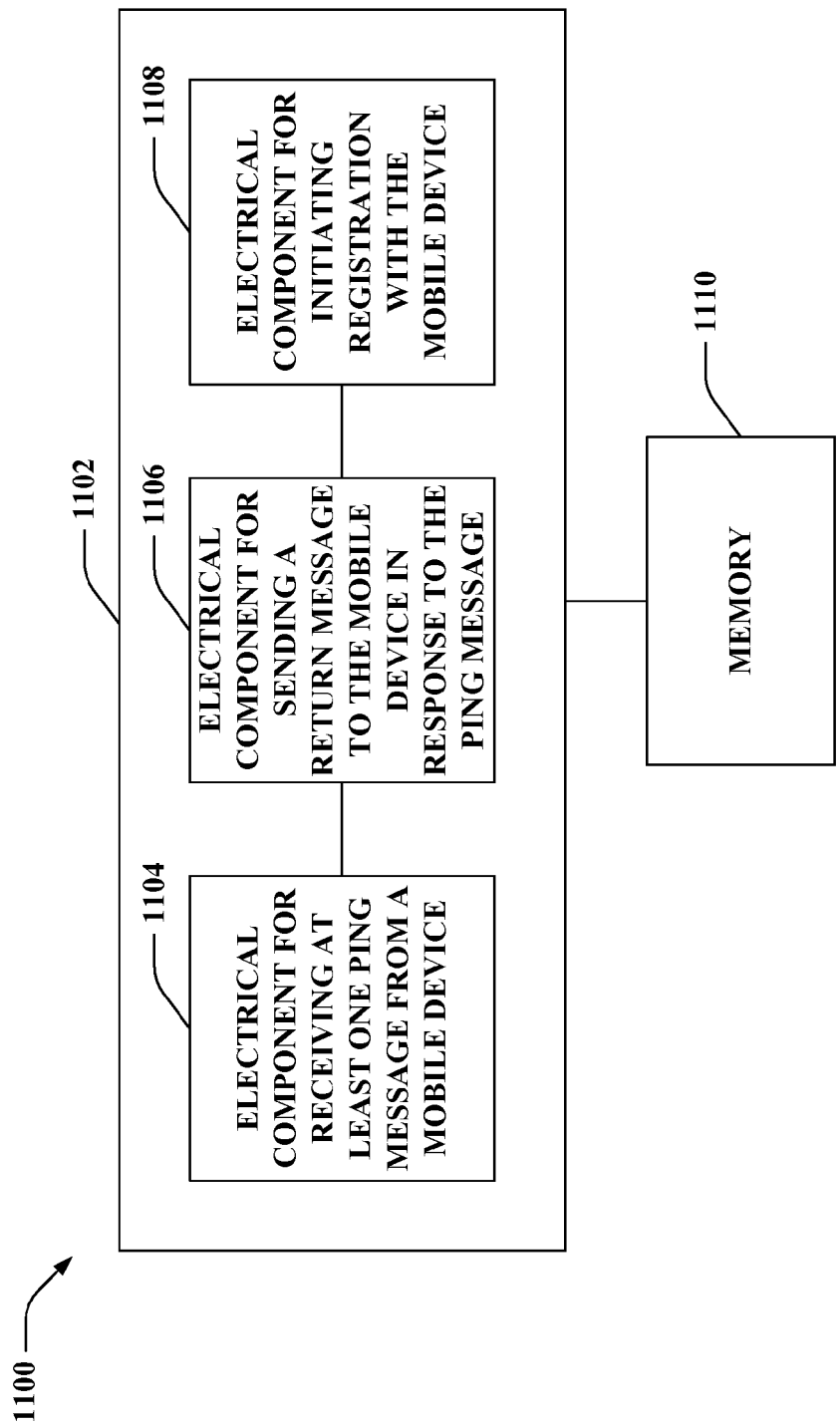
FIG. 11 is an illustration of an example system that facilitates session initiation protocol registration.

FIG. 11 illustrates a system 1100 that determines facilitates session initiation protocol registration. For example, system 1100 can reside at least partially within a base station, mobile device, etc. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for receiving at least one ping message from a mobile device 1104. Further, logical grouping 1102 can comprise an electrical component for sending a return message to the mobile device in response to the at least one ping message 1106. Moreover, logical grouping 1102 can comprise an electrical component for initiating registration with the mobile device 1108. For example, registration with the mobile device can be based at least in part on a round trip time required to transmit and receive the at least one ping message and the return message. Additionally, system 1100 can include a memory 1110 that retains instructions for executing functions associated with electrical components 1104, 1106, and 1108. While shown as being external to memory 1010, it is to be understood that one or more of electrical components 1104, 1106, and 1108 can exist within memory 1110.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for session initiation protocol registration, comprising:
    discovering a plurality of proxy servers, wherein discovering the plurality of proxy servers includes obtaining a list of proxy call session control functions (P-CSCF) from a dynamic host configuration protocol server (DHCP);
    using one or more antennas for conducting a plurality of ping procedures with each discovered proxy server in parallel, wherein each of the plurality of ping procedures includes soliciting a return response from one of the discovered proxy servers;
    measuring a round trip time associated with the each of the plurality of ping procedures to generate a plurality of round trip times; and
    initiating a registration procedure with at least one of the discovered proxy servers based upon at least one of an average of the plurality of round trip times, a minimum of the plurality of round trip times, a maximum of the plurality of round trip times, and a median of the plurality of round trip times.

2. The method of claim 1, further comprising detecting return responses associated with the plurality of ping procedures to ascertain discovered proxy servers that are reachable.

3. The method of claim 2, further comprising ranking the reachable proxy servers based upon the plurality of round trip times.

4. The method of claim 3, wherein initiating the registration procedures comprises commencing registration with each reachable proxy server in turn starting with a proxy server associated with the minimum round trip time until a connection is established.

5. The method of claim 1, further comprising selecting a proxy server from the discovered proxy servers that corresponds to the minimum round trip time.

6. The method of claim 1, further comprising initiating registration procedures with a first server to respond to the plurality of ping procedure solicitations.

7. The method of claim 6, further comprising retaining the return responses to the plurality of ping procedure solicitations received from servers other than the first server.

8. The method of claim 7, further comprising attempting registration with a second server that responded to the plurality of ping procedure solicitations if registration failure occurs with the first server.

9. The method of claim 1, wherein initiating comprises selecting the at least one of the discovered proxy servers based on a predetermined combination of statistical metrics of the average of the plurality of round trip times, the minimum of the plurality of round trip times, the maximum of the plurality of round trip times, and the median of the plurality of round trip times.

10. A communications apparatus for session initiation protocol registration, comprising:
    means for discovering a plurality of proxy servers, wherein the means for discovering the plurality of proxy servers includes means for obtaining a list of proxy call session control functions (P-CSCF) from a dynamic host configuration protocol server (DHCP);
    one or more antennas for conducting a plurality of ping procedures with each discovered proxy server in parallel, wherein each of the plurality of ping procedures includes soliciting a return response from one of the discovered proxy servers;
    means for measuring a round trip time associated with the each of the plurality of ping procedures to generate a plurality of round trip times; and
    means for initiating a registration procedure with at least one of the discovered proxy servers based upon at least one of an average of the plurality of round trip times, a minimum of the plurality of round trip times, a maximum of the plurality of round trip times, and a median of the plurality of round trip times.

11. The apparatus of claim 10 wherein the means for initiating comprises a means for selecting the at least one of the discovered proxy servers based on a predetermined combination of statistical metrics of the average of the plurality of round trip times, the minimum of the plurality of round trip times, the maximum of the plurality of round trip times, and the median of the plurality of round trip times.

12. A wireless communications apparatus, comprising:
    a memory that retains instructions for:
        discovering a plurality of proxy servers, wherein discovering the plurality of proxy servers includes obtaining a list of proxy call session control functions (P-CSCF) from a dynamic host configuration protocol server (DHCP), conducting a plurality of ping procedures with each discovered proxy server in parallel, wherein each of the plurality of ping procedures includes soliciting a return response from one of the discovered proxy servers, measuring a round trip time associated with the each of the plurality of ping procedures to generate a plurality of round trip times, and initiating a registration procedure with at least one of the discovered proxy servers based upon at least one of an average of the plurality of round trip times, a minimum of the plurality of round trip times, a maximum of the plurality of round trip times, and a median of the plurality of round trip times; and
    a processor, coupled to the memory, configured to execute the instructions retained in the memory.

13. The wireless communications apparatus of claim 12, wherein the memory further retains instructions for detecting return responses associated with the plurality of ping procedures to ascertain discovered proxy servers that are reachable.

14. The wireless communications apparatus of claim 13, wherein the memory further retains instructions for ranking reachable proxy servers based upon the plurality of round trip times.

15. The wireless communications apparatus of claim 14, wherein the memory further retains instructions for commencing registration with each reachable proxy server in turn starting with a proxy server associated with the minimum round trip time until a connection is established.

16. The wireless communications apparatus of claim 12, wherein the memory further retains instructions for selecting a proxy server from the discovered proxy servers that corresponds to the minimum round trip time.

17. The wireless communications apparatus of claim 12, wherein the memory further retains instructions for initiating registration procedures with a first server to respond to the plurality of ping procedures solicitations messages.

18. The wireless communications apparatus of claim 17, wherein the memory further retains instructions for retaining return responses to the plurality of ping procedures solicitations received from servers other than the first server.

19. The wireless communications apparatus of claim 18, wherein the memory further retains instructions for attempting registration with a second server that responded to the plurality of ping procedures solicitations if registration failure occurs with the first server.

20. The wireless communications apparatus of claim 12, wherein the memory further retains instructions for selecting the at least one of the discovered proxy servers based on a predetermined combination of statistical metrics of the average of the plurality of round trip times, the minimum of the plurality of round trip times, the maximum of the plurality of round trip times, and the median of the plurality of round trip times.

21. A computer program product, comprising:
    a non-transitory computer-readable medium comprising:
        code for causing a computer to discover a plurality of proxy servers, including code for causing the computer to obtain a list of proxy call session control functions (P-CSCF) from a dynamic host configuration protocol server (DHCP);
        code for causing the computer to conduct a plurality of ping procedures with each discovered proxy server in parallel, wherein each of the plurality of ping procedures includes soliciting a return response from one of the discovered proxy servers;

code for causing the computer to measure a round trip time associated with the each of the plurality of ping procedures to generate a plurality of round trip times; and code for causing the computer to initiate a registration procedure with at least one of the discovered proxy servers based upon at least one of an average of the plurality of round trip times, a minimum of the plurality of round trip times, a maximum of the plurality of round trip times, and a median of the plurality of round trip times.

22. The computer program product of claim 21, wherein the non-transitory computer-readable medium further comprises code for selecting at least one of the discovered proxy servers based on a predetermined combination of statistical metrics of the average of the plurality round trip times, the minimum of the plurality of round trip times, the maximum of the plurality of round trip times, and the median of the plurality of round trip times.

23. An apparatus in a wireless communications system, comprising:
a processor configured to:
discover a plurality of proxy servers, wherein discovering the plurality of proxy servers includes obtaining a list of proxy call session control functions (P-CSCF) from a dynamic host configuration protocol server (DHCP);
conduct a plurality of ping procedures with each discovered proxy server in parallel, wherein each of the plurality of ping procedures includes soliciting a return response from one of the discovered proxy servers;
measure a round trip time associated with the each of the plurality of ping procedures to generate a plurality of round trip times; and
initiate a registration procedure with at least one of the discovered proxy servers based upon at least one of an average of the plurality of round trip times, a minimum of the plurality of round trip times, a maximum of the plurality of round trip times, and a median of the plurality of round trip times.

24. The apparatus of claim 23, wherein the processor is further configured to select at least one of the discovered proxy servers based on a predetermined combination of statistical metrics of the average of the plurality of round trip times, the minimum of the plurality of round trip times, the maximum of the plurality of round trip times, and the median of the plurality of round trip times.

25. A method for session initiation protocol registration of a mobile device, comprising:
discovering a plurality of proxy servers by a communication apparatus, wherein discovering the plurality of proxy servers includes obtaining a list of proxy call session control functions (P-CSCF) from a dynamic host configuration protocol server (DHCP);
using one or more antennas to conduct a plurality of ping procedures with the plurality of proxy servers from a mobile device by the communications apparatus, wherein the plurality of ping procedures are conducted in parallel;
sending a return message to the mobile device by the communications apparatus associated with each of the plurality of ping procedures; and
initiating a registration procedure by the communications apparatus for the mobile device with at least one proxy server from the plurality of proxy servers based at least in part on at least one of an average round trip time associated with the ping procedures, a minimum round trip time associated with the ping procedures, a maximum round trip time associated with the ping procedures, and a median round trip time associated with the ping procedures.

26. The method of claim 25, further comprising registering with at least one server that includes a list of proxy servers.

27. The method of claim 26, wherein registering with the at least one server adds an entry to the list of servers.

28. The method of claim 25, wherein initiating the registration procedure for the mobile device with the at least one proxy server from the plurality of proxy servers comprises selecting the at least one proxy server based on a predetermined combination of statistical metrics of the average round trip time, the minimum round trip time, the maximum round trip time, and the median round trip time.

29. A communications apparatus for session initiation protocol registration, comprising:
means for discovering a plurality of proxy servers, wherein the means for discovering the plurality of proxy servers includes means for obtaining a list of proxy call session control functions (P-CSCF) from a dynamic host configuration protocol server (DHCP);
one or more antennas for conducting a plurality of ping procedures with the plurality of proxy servers from a mobile device, wherein the plurality of ping procedures are conducted in parallel;
means for sending a return message to the mobile device associated with each of the plurality of ping procedures; and
means for initiating a registration procedure for the mobile device with at least one proxy server from the plurality of proxy servers based at least in part on at least one of an average round trip time associated with the ping procedures, a minimum round trip time associated with the ping procedures, a maximum round trip time associated with the ping procedures, and a median round trip time associated with the ping procedures.

30. The communications apparatus of claim 29, wherein the means for initiating the registration procedure for the mobile device with the at least one proxy server from the plurality of proxy servers selects the at least one proxy server based on a predetermined combination of statistical metrics of the average round trip time, the minimum round trip time, the maximum round trip time, and the median round trip time.

31. A wireless communications apparatus, comprising:
a memory that retains instructions for discovering a plurality of proxy servers, wherein discovering the plurality of proxy servers includes obtaining a list of proxy call session control functions (P-CSCF) from a dynamic host configuration protocol server (DHCP), conducting a plurality of ping procedures with the plurality of proxy servers from a mobile device, wherein the plurality of ping procedures are conducted in parallel, sending a return message to the mobile device associated with each of the plurality of ping procedures, and initiating a registration procedure for the mobile device with at least one proxy server from the plurality of proxy servers based at least in part on at least one of an average round trip time associated with the ping procedures, a minimum round trip time associated with the ping procedures, a maximum round trip time associated with the ping procedures, and a median round trip time associated with the ping procedures; and
a processor, coupled to the memory, configured to execute the instructions retained in the memory.

32. The wireless communications apparatus of claim 31, wherein the memory further retains instructions for registering with at least one server that includes a list of proxy servers.

33. The wireless communications apparatus of claim 32, wherein registering with the at least one server adds an entry to the list of servers.

34. The wireless communication apparatus of claim 31, wherein the memory further retains instructions for selecting the at least one proxy server based on a combination of statistical metrics of the average round trip time, the minimum round trip time, the maximum round trip time, and the median round trip time.

35. A computer program product, comprising:
a non-transitory computer-readable medium comprising:
code for causing a computer to discover a plurality of proxy servers, wherein discovering the plurality of proxy servers includes obtaining a list of proxy call session control functions (P-CSCF) from a dynamic host configuration protocol server (DHCP);
code for causing the computer to conduct a plurality of ping procedures with the plurality of proxy servers from a mobile device, wherein the plurality of ping procedures are conducted in parallel;
code for causing the computer to send a return message to the mobile device associated with each of the plurality of ping procedures; and
code for causing the computer to initiate a registration procedure for the mobile device with at least one proxy server from the plurality of proxy servers based at least in part on at least one of an average round trip time associated with the ping procedures, a minimum round trip time associated with the ping procedures, a maximum round trip time associated with the ping procedures, and a median round trip time associated with the ping procedures.

36. The computer program product of claim 35, wherein the non-transitory computer-readable medium further comprises code for selecting the at least one proxy server based on a predetermined combination of statistical metrics of the average round trip time, the minimum round trip time, the maximum round trip time, and the median round trip time.

37. A communications apparatus in a wireless communications system, comprising:
a processor configured to:
discover a plurality of proxy servers, wherein discovering the plurality of proxy servers includes obtaining a list of proxy call session control functions (P-CSCF) from a dynamic host configuration protocol server (DHCP);
conduct a plurality of ping procedures with the plurality of proxy servers from a mobile device, wherein the plurality of ping procedures are sent in parallel;
send a return message to the mobile device associated with each of the plurality of ping messages; and
initiate a registration procedure for the mobile device with at least one proxy server from the plurality of proxy servers based at least in part on at least one of an average round trip time associated with the ping procedures, a minimum round trip time associated with the ping procedures, a maximum round trip time associated with the ping procedures, and a median round trip time of associated with the ping procedures.

38. The apparatus of claim 37, wherein the processor is further configured to select the at least one proxy server based on a predetermined combination of statistical metrics of the average round trip time, the minimum round trip time, the maximum round trip time, and the median round trip time.

\* \* \* \* \*